United States Patent [19]

Pisarski

[11] Patent Number: 5,584,450
[45] Date of Patent: Dec. 17, 1996

[54] METAL CLAD ELECTRO-EXPULSIVE DEICER WITH SEGMENTED ELEMENTS

[75] Inventor: Nathan Pisarski, Stow, Ohio

[73] Assignee: The B. F. Goodrich Company, Akron, Ohio

[21] Appl. No.: 378,037

[22] Filed: Jan. 24, 1995

Related U.S. Application Data

[63] Continuation-in-part of Ser. No. 918,349, Jul. 21, 1992, abandoned.

[51] Int. Cl.⁶ .................................................. B64D 15/00
[52] U.S. Cl. .................................. 244/134 D; 244/134 R
[58] Field of Search ......................... 244/134 D, 134 R, 244/134 A

[56] References Cited

U.S. PATENT DOCUMENTS

| 4,678,144 | 7/1987 | Goehner et al. | 244/134 R |
| 4,690,353 | 9/1987 | Haslim et al. | 244/134 D |
| 4,875,644 | 10/1989 | Adams et al. | 244/134 R |
| 5,098,037 | 3/1992 | Leffel et al. | 244/134 A |
| 5,143,325 | 9/1992 | Zieve et al. | 244/134 D |

Primary Examiner—Christopher P. Ellis
Attorney, Agent, or Firm—Richard A. Romanchik

[57] ABSTRACT

An electro-expulsive deicing system 114 for attachment to an airfoil 110 is comprised of a plurality of electro-expulsive elements 120 separated by a dielectric filler regions 122 all of which are disposed between a top dielectric layer 124 and a bottom dielectric layer 128. A contiguous top skin layer 116 covers the entire deicing apparatus 114.

28 Claims, 7 Drawing Sheets

METAL CLAD ELECTRO-EXPULSIVE DEICER WITH SEGMENTED ELEMENTS

This is a continuation-in-part application of application Ser. No. 07/918,349 filed Jul. 21,1992, now abandoned.

TECHNICAL FIELD

This invention relates to a system for separating a solid body, such as a layer of ice, from the surface of a resilient member, and more particularly, to an electrically activated deicer for use on the leading edges of an aircraft.

BACKGROUND OF THE INVENTION

Under certain operating conditions aircraft are vulnerable to accumulation of ice on component surfaces. If left unchecked, such accumulations can eventually so laden the aircraft with additional weight and so alter the airfoil configuration of the wings as to cause undesirable flying conditions. A wide variety of systems have been purposed for removing ice from aircraft during flight or for preventing its accumulation on the leading edge surfaces of such aircraft. These systems can be categorized in three ways: thermal, chemical and mechanical.

The mechanical category of deicing systems covers a wide range of devices, all of which distort the airfoil surface in some manner so as to shed ice from the airfoil surface. A subcategory of mechanical deicing systems are electro-expulsive deicers wherein electric current is passed in opposite directions through a pair of conductors located closely to one another so that interacting magnetic fields force the conductors apart to thereby deform the ice collecting walls. An example of electro-expulsive deicing systems can be found in three disclosures discussed hereinafter.

In U.S. Pat. No. 3,809,341 to Levin et al., flat buses are arranged opposite one another with one side of each bus being adjacent an inner or obverse surface of an ice collecting wall. An electric current is passed through each bus and the resulting interacting magnetic fields force the buses apart and deform the ice collecting walls. The disadvantage of this system is that each bus operates on the structural skin of the airfoil and a predetermined skin deflection is required to provide a set level of ice removal, thereby necessitating large force requirements in order to generate the needed amount of skin deflection. Such high skin deflections are believed likely to cause fatigue in the skin.

U.S. Pat. No. 4,690,353 to Haslim et al. discloses a system wherein one or more overlapped flexible ribbon conductors are embedded in an elastomeric material affixed to the outer surface of an airfoil structure. The conductors are fed large current pulses and the resulting interacting magnetic fields produce an electro-expulsive force which distends the elastomeric member and separates the elastomeric member from a solid body such as ice thereon. The conductors in a single conductive layer as disclosed by Haslim et al. have a serpentine or zig-zag configuration.

Commonly owned U.S. Pat. No. 4,875,644 to Adams et al. discloses an electro-expulsive deicing system wherein a plurality of expulsive elements are placed in different layers on the airfoil surface, with each element being comprised of electrically conductive members interconnected such that electric current flowing in the conductive members flows in the same direction in adjacent electrically conductive members in a first sheet-like array and also flows in adjacent electrically conductive members of a second sheet-like array in a direction opposite to the first.

The present invention is an improvement over the electro-expulsive deicing systems disclosed in Haslim et al. and Adams et al.. Applicants have found that disposition of multiple electro-expulsive elements within a common, metal clad, attachable boot provides improved deicing characteristics.

DISCLOSURE OF THE INVENTION

According to the present invention, a plurality of electro-expulsive elements are disposed within a singular deicing airfoil attachment. The elements are disposed between a bottom dielectric layer which is attached to the airplane and a top dielectric layer. A top skin layer is disposed on top of the top dielectric layer and serves as the airfoil surface.

In one aspect of the present invention, the electro-expulsive elements are located adjacent to one another in a contiguous array of elements along the chordwise length of the deicing apparatus.

In another aspect of the present invention, the electro-expulsive elements are separated from one another by one or more filler areas.

With the present invention, fewer elements are needed to deice an airfoil than previous deicing systems, which consequently provides for lower power consumption. The present invention is easily manufacturable and can be retrofitably installed on existing aircraft.

These and other objects, features, and advantages of the present invention will become more apparent in light of the detailed description of exemplary embodiments thereof, as illustrated by the drawings.

BEST MODE FOR CARRYING OUT THE INVENTION

Figure 1:
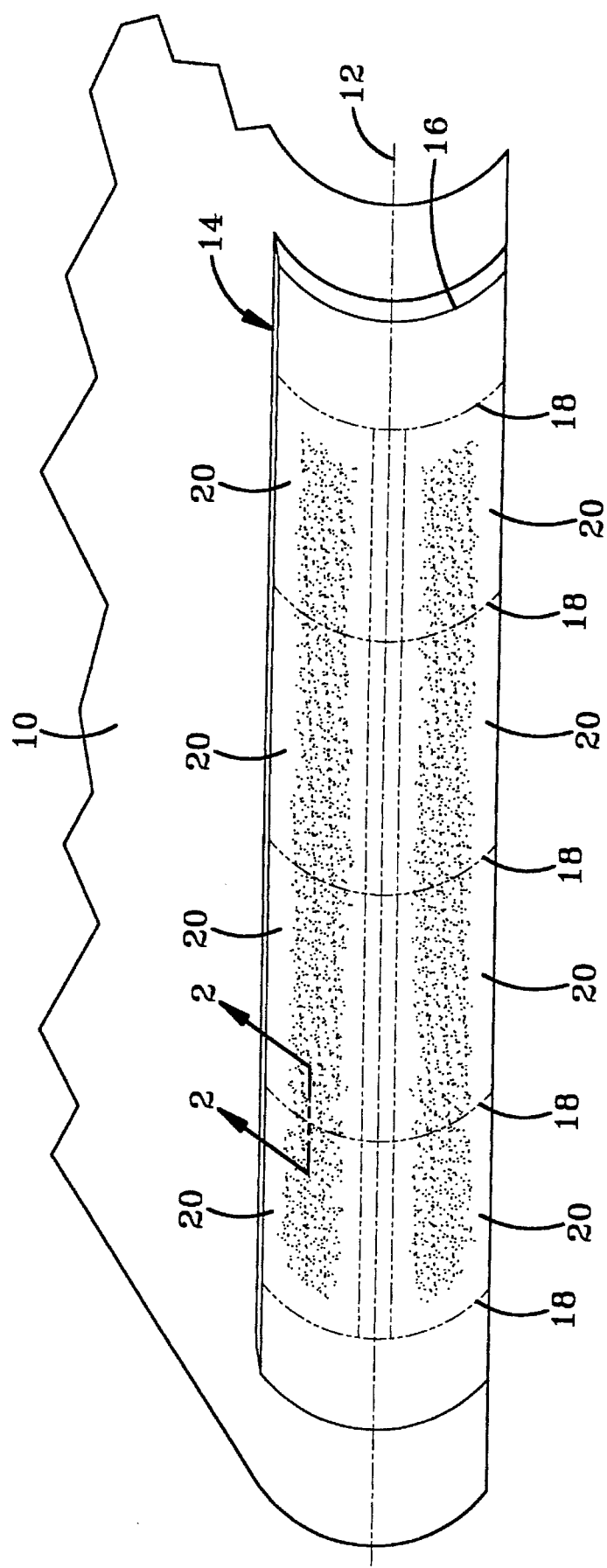
FIG. 1 is an isometric view of a first embodiment of a deicing system in accordance with the present invention.

Referring now to FIG. 1, an airfoil 10 has a leading edge having a center line 12. A first embodiment of a deicing system 14 in accordance with the present invention is disposed on the leading edge of airfoil 10 symmetrical about the center line 12 of such leading edge. Deicing system 14 is attachable and has a contiguous top skin layer 16 covering the entire deicing system 14. Dotted lines 18 illustrate the position of electro-expulsive element areas 20, with each area 20 having at least one electro-expulsive element provided therein to cause deformation of the top skin layer 16 covering the area 20 over the element(s) and also the top skin layer 16 covering adjacent areas.

Figure 2:
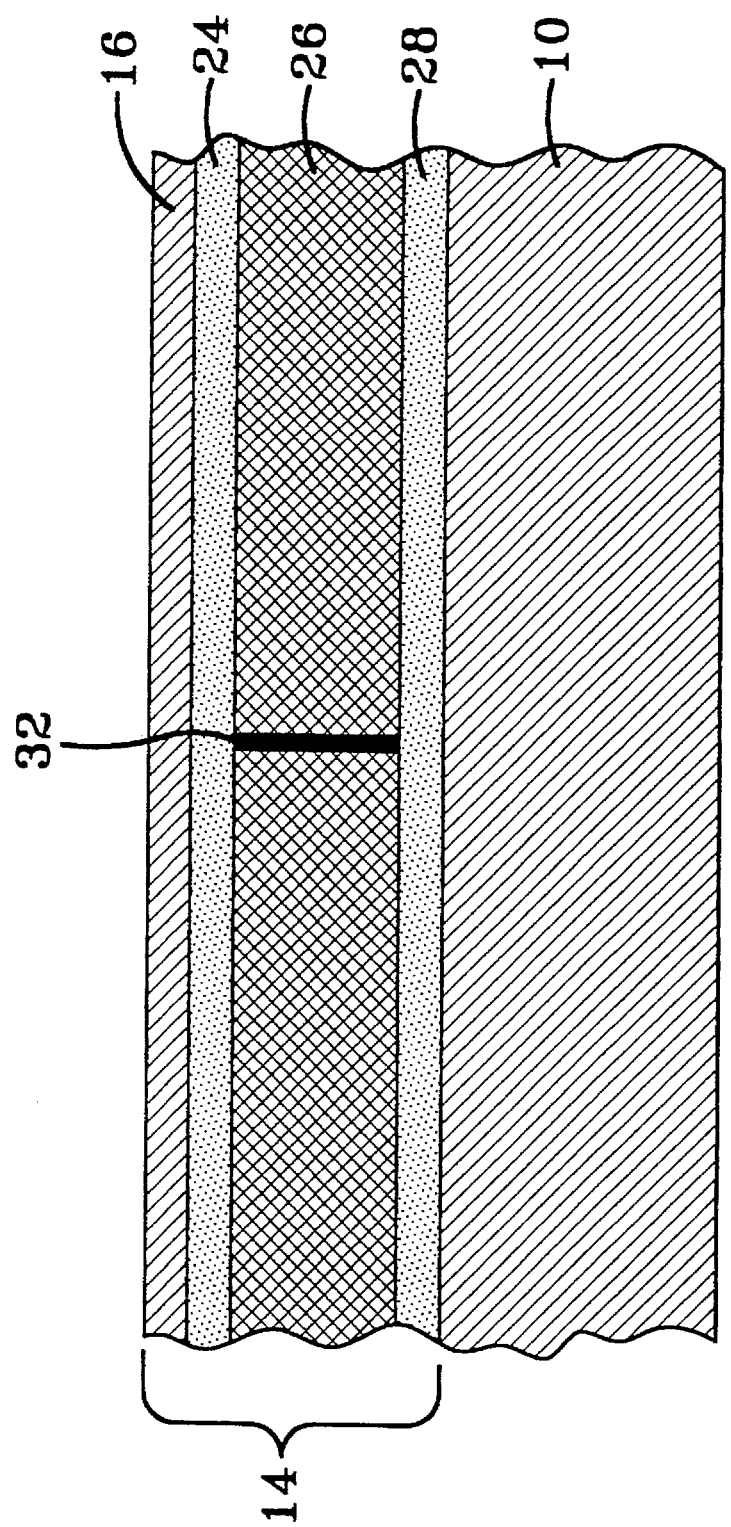
FIG. 2 is a cross-sectional view, taken along line 2—2 of FIG. 1, of a first embodiment of a deicing system in accordance with the present invention.

Referring now to FIG. 2, the deicing system 14 includes from top to bottom: a top skin layer 16; a top dielectric layer 24; electro-expulsive elements 26; and, a bottom dielectric layer 28 which is attached to the airplane structure 10. Layers 16, 24, 26 and 28 are bonded or attached to one another. The electro-expulsive elements 26 are disposed adjacent to one another with a thin separation 32 provided perhaps therebetween. Skin layer 16 must be comprised of a suitable elastic or resilient material having a modulus of elasticity of at least 40,000 Kpa. The term "elastic" refers to the tendency of a material to return entirely to its rest state within a short period of time after an imposed force is removed. Preferred material for top skin layer 16 is a 0.005 inch thick sheet of metal, such as aluminum, titanium or stainless steel. However, the top skin layer 16 may be comprised of any of a number of other suitable materials, such as polyetheretherketone (PEEK) or other plastic. The preferred material for the dielectric layers 24, 28 is about 0.005 to 0.010 inch thick layer of epoxy adhesive film. Elements 26 may be comprised of electro-expulsive elements such as those disclosed in commonly owned U.S. Pat. No. 4,875,644 to Adams et al., which is hereby incorporated herein by reference. In particular, it is preferred that elements 26 be configured such as those illustrated in FIGS. 1A and 2A of such patent.

The contiguous top skin layer 16 disposed over a plurality of electroexpulsive elements 26 in accordance with the present invention provides for improved deicing capabilities than separated, independently acting elements of the prior art, such as those disclosed in FIG. 8A of the Adams et al. patent.

Figure 3:
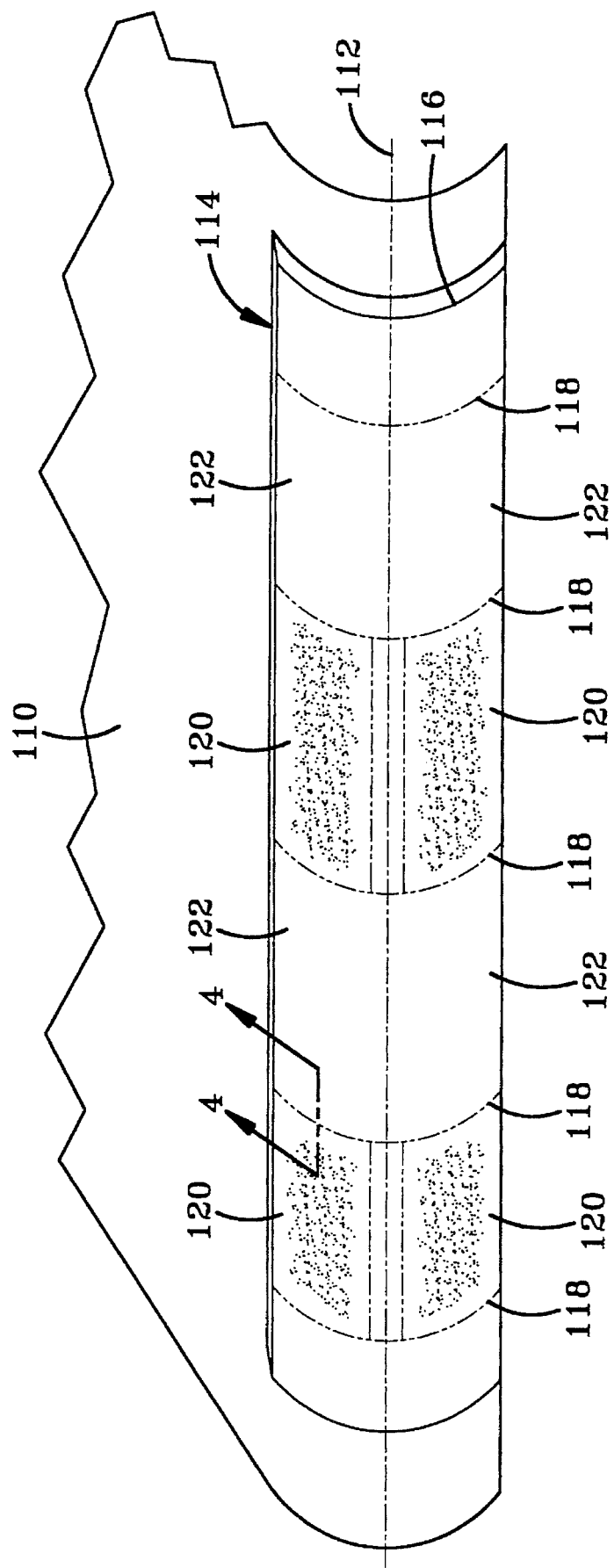
FIG. 3 is an isometric view of a second embodiment of a deicing system in accordance with the present invention.

Referring now to FIG. 3, wherein an electro-expulsive deicing system 114 is generally similar to the electro-expulsive deicing system embodiments illustrated hereinbefore in the previous figures and is thus indicated by reference numerals corresponding to those discussed above, except that a 100 "prefix" is utilized. In a second embodiment of the present invention, an airfoil 110 has a leading edge having a center line 112. A deicing system 114 in accordance with the second embodiment of the present invention includes a contiguous top skin layer 116. Dotted lines 118 indicate electro-expulsive element areas 120 where electro-expulsive elements are disposed within deicing system 114. For illustration purposes only, electro-expulsive element areas 120 have been shaded in. In between the areas where elements are located, a filler area 122 is provided for maintaining a smooth and contiguous airfoil surface.

Figure 4:
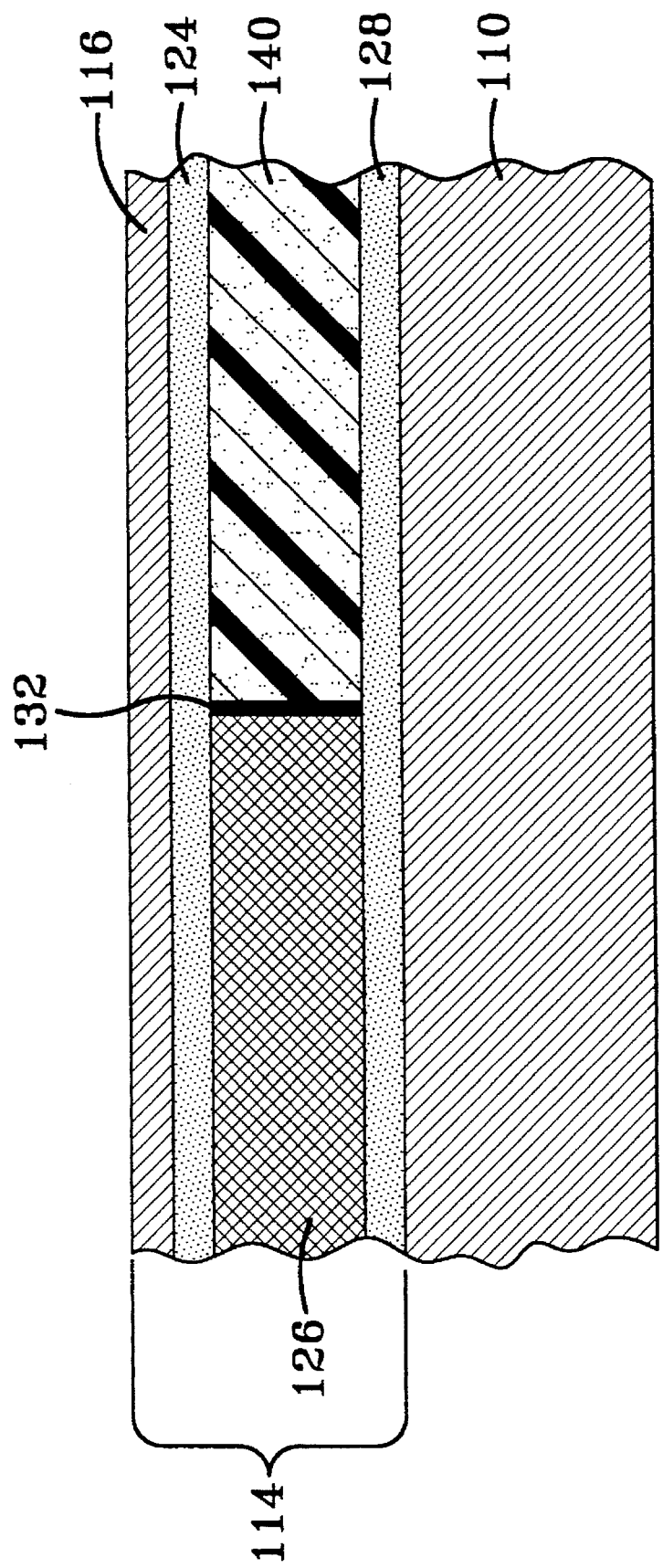
FIG. 4 is a cross-sectional view, taken along line 4—4 of FIG. 3, of a second embodiment of a deicing system in accordance with the present invention.

Referring now to FIG. 4, a second embodiment of a deicing system 114 in accordance with the present invention includes from top to bottom: a contiguous top skin layer 116; a dielectric layer 124; a layer comprised of alternating electrical isolation fillers 140 and electro-expulsive elements 126; and, a bottom dielectric layer 128 which is thereby attached to the airplane structure 110. Isolation fillers 140 may be comprised of a flexible foam, such as polyurethane foam. Preferably, isolation filler sections 122 are on the order of the same size as the electro-expulsive element sections 120.

Figure 5:
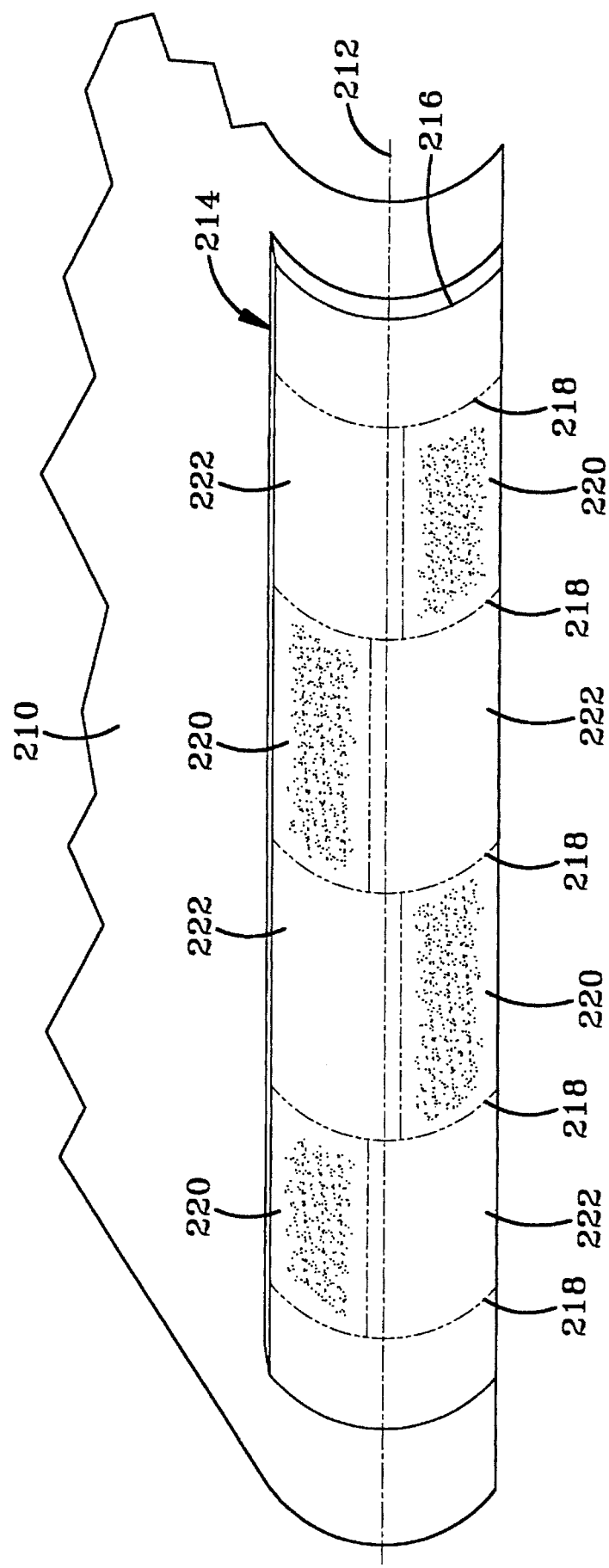
FIG. 5 is an isometric view of a third embodiment of a deicing system in accordance with the present invention.

Referring now to FIG. 5, wherein an electro-expulsive deicing system 214 is generally similar to the electro-expulsive deicing system embodiments illustrated hereinbefore in the previous figures and is thus indicated by reference numerals corresponding to those discussed above, except that a 200 "prefix" is utilized. In a third embodiment of the present invention, an airfoil 210 has a leading edge having a center line 212. A deicing system 214 in accordance with the third embodiment of the present invention includes a contiguous top skin layer 216. Dotted lines 218 indicate electro-expulsive element areas 220 where electro-expulsive elements are disposed within deicing system 214. For illustration purposes only, electro-expulsive element areas 220 have been shaded in. In between the areas where elements are located, a filler area 222 is provided for maintaining a smooth and contiguous airfoil surface.

It is to be noted that electro-expulsive elements may be segmented and placed at various locations under the top skin layers 116, 216 with filler areas 122, 222 being disposed therebetween to maintain a smooth, contiguous airfoil contour. For exemplary purposes, electro-expulsive element areas 120, 220 and filler areas 122, 222 are illustrated in FIGS. 3 and 5 as being positioned in symmetrical patterns about the leading edge axis. The advantage of these embodiments is that fewer electro-expulsive element areas 120, 220 are required to deice an airfoil than the contiguous element design shown and illustrated hereinbefore for FIG. 1. Ice is removed by high surface accelerations and displacements caused by the forces developed by electro-expulsive elements in the element areas 120, 220 adjacent to the filler areas 122. To this end, accelerations have been measured on the top skin adjacent to electro-expulsive deicer elements which are capable of shedding both ice droplets and relatively thick layers of ice.

Figure 6:
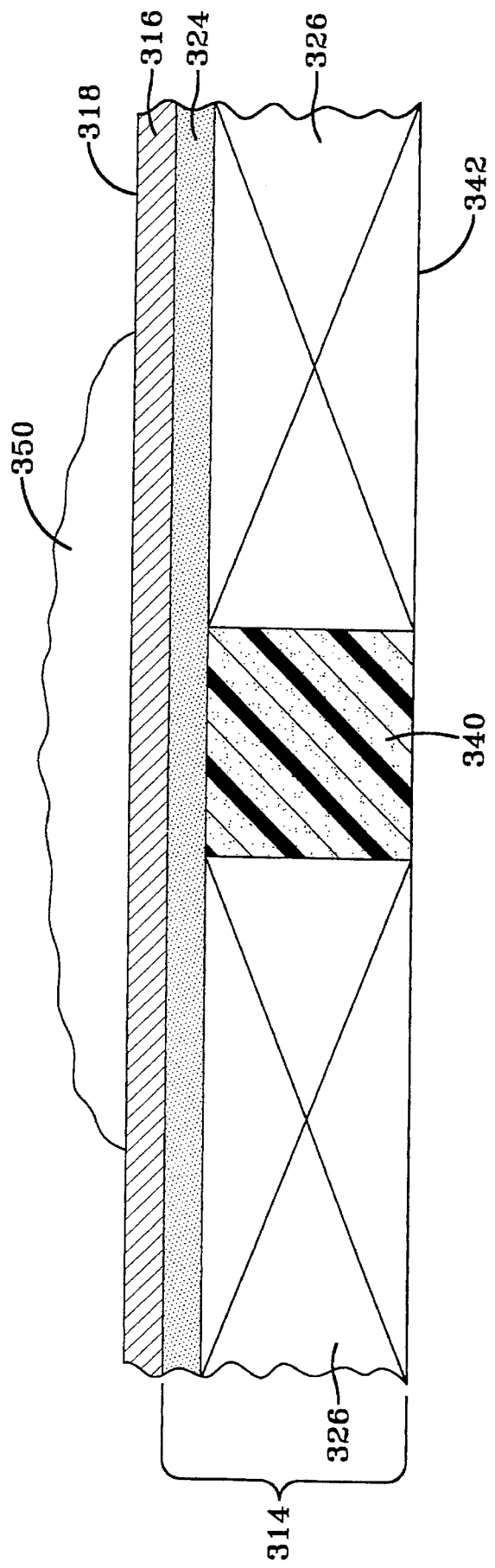
FIG. 6 is a cross-sectional view of a third embodiment of a deicing system in accordance with the present invention.

Referring now to FIG. 6, wherein an electro-expulsive deicing system 314 is generally similar to the electro-expulsive deicing system embodiments illustrated hereinbefore in the previous figures and is thus indicated by reference numerals corresponding to those discussed above, except that a 300 "prefix" is utilized. In accordance with an alternative embodiment of the present invention, a deicing system 314 includes a plurality of electro-expulsive deicing elements 326 separated by a filler member 340. As described hereinbefore, elements 326 may also be disposed adjacent on another. Elements 326 and filler member 340 are bonded or otherwise attached to an airfoil skin 316 which has a surface 318 exposed to contaminants 350. Elements 326 and filler member 340 are bonded to skin 316 preferably with a film adhesive such as 1300L available from 3M or an epoxy system. Other adhesives known to those skilled in the art, however, may be utilized. The bottom side 342 of deicing system 314 is not supported. Applicants have discovered that the electromagnetic separation forces generated within electro-expulsive type deicing elements cause deflection of the airfoil skin without underlying support. Supports such as items 10 and 110 shown in FIGS. 2 and 4 are therefore unnecessary. In this manner, the deicing system may be installed on an airfoil skin segment in a shop and the skin segment may then be later installed onto an aircraft, thus minimizing aircraft down time. It is to be noted that a dielectric, or insulative layer may be necessary below the active elements for insulation purposes.

Figure 7:
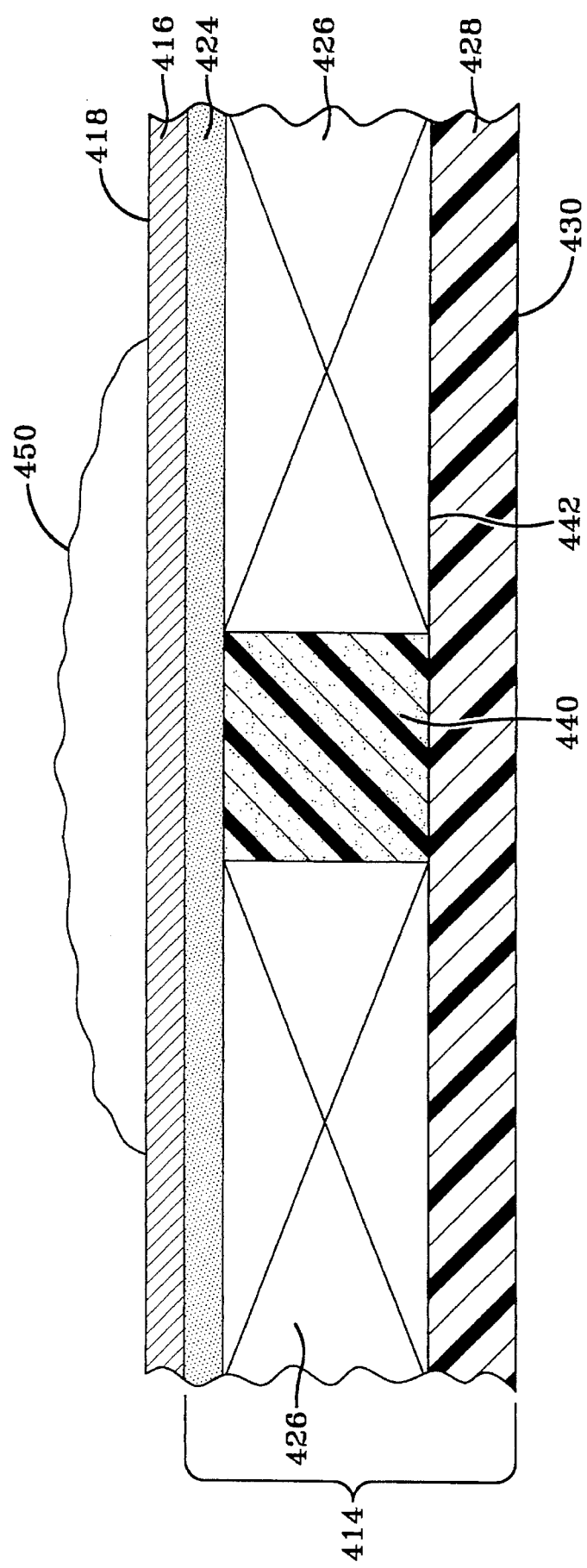
FIG. 7 is a cross-sectional view of a fourth embodiment of a deicing system in accordance with the present invention.

Referring now to FIG. 7, wherein an electro-expulsive deicing system 414 is generally similar to the electro-expulsive deicing system embodiments illustrated hereinbefore in the previous figures and is thus indicated by reference numerals corresponding to those discussed above, except that a 400 "prefix" is utilized. In accordance with an alternative embodiment of the present invention, a deicing system 414 includes a plurality of electro-expulsive deicing elements 426 separated by a filler member 440. As described hereinbefore, elements 426 may also be disposed adjacent on another. Elements 426 and filler member 440 are bonded or otherwise attached to an airfoil skin 416 which has a surface 418 exposed to contaminants 450. Elements 426 and filler member 440 are bonded to skin 416 preferably with a film adhesive such as 1300L available from 3M or an epoxy system. Other adhesives known to those skilled in the art, however, may be utilized. A bottom layer 428 is disposed on the bottom side 442 of elements 426 and filler 440. The bottom side 430 of deicing system layer 428 is not supported. Layer 428 is utilized to provide minimum amount of support to elements 426 in order to prevent excessive deflections in a direction away from skin 416. Layer 428 is preferably comprised of a rigid material such as a rigid elastomer or a plastic reinforced composite, such as epoxy or fiberglass reinforced composites. It is to be noted that a dielectric, or insulative layer may be necessary below the bottom layer 428, or bottom layer 428 may itself be insulative.

Although the invention has been shown and described with exemplary embodiments thereof, it should be understood by those skilled in the art of the foregoing and various other changes, omissions and additions may be made therein and thereto without departing from the spirit and the scope of the invention.

I claim:

1. A deicing apparatus for an airfoil having a leading edge with a centerline that bisects the airfoil into first and second sides, the deicing apparatus comprising:

a plurality of electro-expulsive element means disposed on the first side of the airfoil;

at least one filler means disposed on the first side of the airfoil adjacent at least one of said electro-expulsive element means; and, an outer skin contiguously covering said electro-expulsive element means and said filler means;

wherein said electroexpulsive element means rapidly distort said outer skin.

2. A deicing apparatus according to claim 1 further comprising:

a top dielectric layer of an electrical insulator disposed between said outer skin and said electro-expulsive element means.

3. A deicing apparatus according to claim 1, further comprising:

a bottom dielectric layer disposed between said electro-expulsive means and the airfoil.

4. A deicing apparatus according to claim 1, wherein said outer skin is on the order of 0.005 inches thick.

5. A deicing apparatus according to claim 1, wherein said outer skin is comprised of metal.

6. A deicing apparatus according to claim 1, wherein said outer skin is comprised of polyetheretherketone (PEEK).

7. A deicing apparatus according to claim 1 wherein said outer skin has a modulus of elasticity of at least 40,000 kPA.

8. A deicing apparatus according to claim 1, wherein said filler means is comprised of flexible foam.

9. A deicing apparatus according to claim 1, wherein said filler means is on the order of the same size as said electro-expulsive element means.

10. A deicing apparatus according to claim 1, wherein said electro-expulsive element means, filler means and outer skin are disposed on both said first and second sides of the airfoil.

11. A deicing apparatus for an airfoil having a leading edge with a centerline that bisects the airfoil into first and second sides, the deicing apparatus comprising:

a plurality of electro-expulsive element means disposed on the first side of the airfoil;

a plurality of filler means disposed on the first side of the airfoil with at least one filler means being disposed between said electro-expulsive element means;

an outer skin contiguously covering said electro-expulsive element means and said filler means, a top electrical insulator layer disposed between said outer skin and said electro-expulsive element means; and, a bottom electrical insulator layer disposed between said electro-expulsive means and the airfoil, wherein said outer skin is exposed to the environment and said electroexpulsive element means rapidly distort said outer skin.

12. A deicing apparatus according to claim 11, wherein said outer skin is on the order of 0.005 inches thick.

13. A deicing apparatus according to claim 11, wherein said outer skin is comprised of metal.

14. A deicing apparatus according to claim 11, wherein said outer skin is comprised of polyetheretherketone (PEEK).

15. A deicing apparatus according to claim 11, wherein said filler means are on the order of the same size as said electro-expulsive element means.

16. A deicing apparatus according to claim 11, wherein said filler means are comprised of flexible foam.

17. A deicing apparatus according to claim 1, wherein said electro-expulsive element means, filler means and outer skin are disposed on both said first and second sides of the airfoil.

18. A deicing apparatus according to claim 11 wherein said outer skin is comprised has a modulus of elasticity of at least 40,000 kPA.

19. A deicing apparatus for an airfoil having a leading edge with a centerline that bisects the airfoil into first and second sides, the deicing apparatus comprising:

a plurality of electro-expulsive element means disposed on the first side of the airfoil;

a plurality of filler-means disposed on the first side of the airfoil with at least one filler means being disposed between said electro-expulsive element means;

an outer skin contiguously covering said electro-expulsive element means and said filler means, wherein said electro-expulsive element means cause rapid distortion of said outer skin.

20. A deicing apparatus for an airfoil in accordance with claim 19, wherein at least one of said filler means is disposed between said electro-expulsive element means.

21. A deicing apparatus in accordance with claim 19, wherein said electro-expulsive element means, filler means and outer skin are disposed on both said first and second sides of the airfoil.

22. A deicing apparatus for an airfoil having a leading edge with a centerline that bisects the airfoil into first and second sides in accordance with claim 1, wherein at least two electro-expulsive element means are disposed adjacent one another.

23. A deicing apparatus for an airfoil having a leading edge with a centerline that bisects the airfoil into first and second sides in accordance with claim 19, wherein at least two electro-expulsive element means are disposed adjacent one another.

24. A deicing apparatus for deicing an airfoil skin having an exposed side and an unexposed side comprising:

at least one electro-expulsive element means;

an adhesive layer for bonding said electro-expulsive element means to the unexposed side of the airfoil skin; and at least one filler means disposed adjacent at least one of said electro-expulsive element means.

25. A deicing apparatus for deicing an airfoil skin having an exposed side and an unexposed side comprising:

a plurality of electro-expulsive element means;

an adhesive layer for bonding said electro-expulsive element means to the unexposed side of the airfoil skin; and, at least one filler means disposed adjacent at least one of said electro-expulsive element means.

26. (Once Amended) A deicing apparatus for deicing an airfoil skin having an exposed side and an unexposed side comprising:

a plurality of electro-expulsive element means;

an adhesive layer for bonding said electro-expulsive element means to the unexposed side of the airfoil skin; and, at least one filler means disposed between a pair of said electro-expulsive element means.

27. A method of deicing an airfoil skin having an exposed side and an unexposed side comprising the step of:

bonding at least one electro-expulsive element means to the unexposed side of the airfoil skin, wherein said electro-expulsive element means is comprised of a plurality of electro-expulsive elements and at least one filler means disposed adjacent at least one of said electro-expulsive elements.

28. A method of deicing an airfoil skin having an exposed side and an unexposed side comprising the step of:

bonding at least one electro-expulsive element means to the unexposed side of the airfoil skin, wherein said at least one electro-expulsive element means is comprised of a plurality of electro-expulsive elements and at least one filler means disposed between at least one pair of said plurality of electro-expulsive elements.

\* \* \* \* \*